Feb. 2, 1960 V. E. GLEASMAN 2,923,174
DIFFERENTIAL DRIVE MECHANISM
Filed Dec. 22, 1955 2 Sheets-Sheet 1

INVENTOR.
VERNON E. GLEASMAN
BY
ATTORNEYS

Feb. 2, 1960 V. E. GLEASMAN 2,923,174
DIFFERENTIAL DRIVE MECHANISM
Filed Dec. 22, 1955 2 Sheets-Sheet 2

INVENTOR.
VERNON E. GLEASMAN
BY
*Hyde, Meyer, Baldwin & Doran*
ATTORNEYS

United States Patent Office 2,923,174
Patented Feb. 2, 1960

2,923,174

DIFFERENTIAL DRIVE MECHANISM

Vernon E. Gleasman, Cleveland, Ohio

Application December 22, 1955, Serial No. 554,715

12 Claims. (Cl. 74—711)

This invention relates to a differential drive mechanism for a motor-driven vehicle and other differential applications.

One of the objects of the present invention is to provide a differential drive construction providing a locked, direct drive to prevent spinning of one wheel when one wheel has no traction, but permitting normal differential action when road conditions, such as turning around a corner, force one wheel to travel faster than the other to provide the differential action.

A further object of the present invention is to provide a differential drive construction including, in addition to a balance gear means, a coacting driving wedge means to provide not only the normal differential action but also a traction advantage when the coefficient of friction varies between the driving wheels.

A further object of the present invention is to provide a differential drive construction having a helical spline therein so that the helix angle of said spline can be designed according to the desired traction of the wheels under wheel spinning conditions and/or so that the differential will transmit a high torque in relation to its size.

A further object of the present invention is to provide a differential drive construction compact in construction, easily installed in an unusually small space, capable of transmitting high torques, having structural simplicity, being inexpensive to manufacture, being easy to assemble, having operating efficiency, and having a strong and sturdy construction.

Other features of this invention reside in the arrangement and design of the parts for carrying out their appropriate functions.

Other objects and advantages of this invention will be apparent from the accompanying drawings and description, and the essential features will be set forth in the appended claims.

In the drawings,

Fig. 4 is a simplified pictorial representation of the mode of operation of the differential and will be described in more detail during the description of the operation at the end of this specification; while

Before the differential drive construction here illustrated is specifically described, it is to be understood that the invention here involved is not limited to the structural details or arrangement of parts here shown since mechanism embodying the present invention may take various forms. It also is to be understood that the phraseology or terminology herein employed is for purposes of description and not of limitation since the scope of the present invention is denoted by the appended claims.

Figure 1:
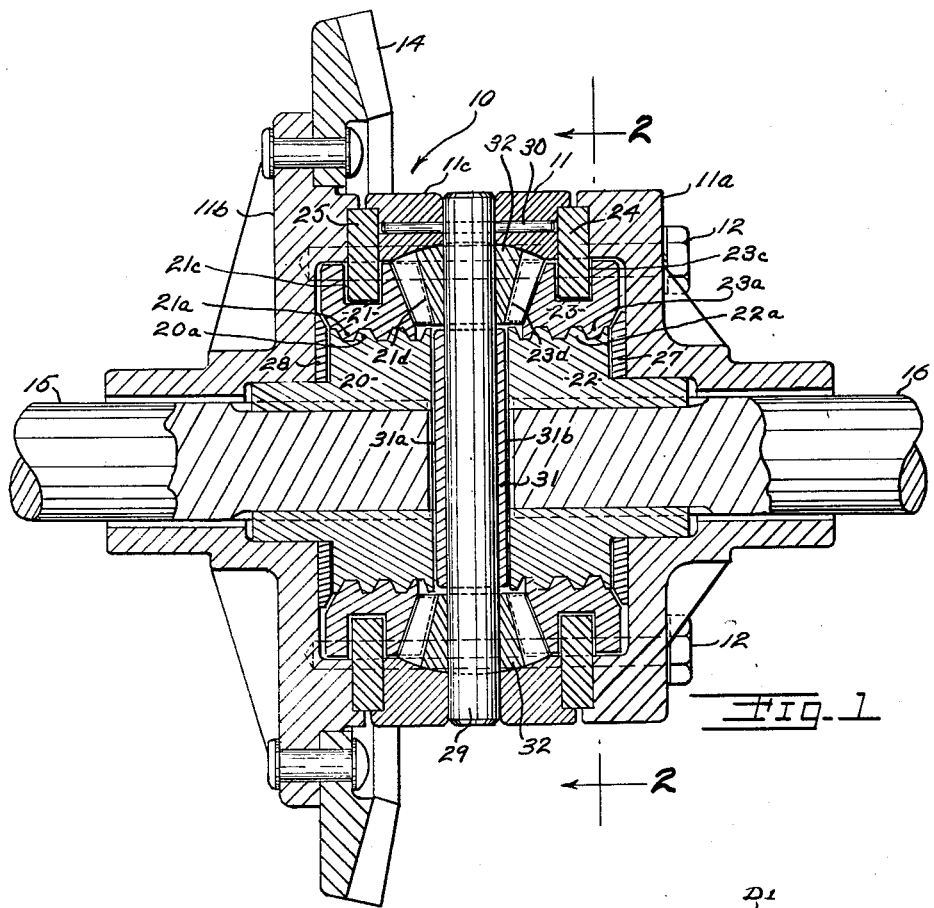
Fig. 1 is a longitudinal sectional view through my improved differential drive construction taken along the axis of the driven shafts.
Figure 3:
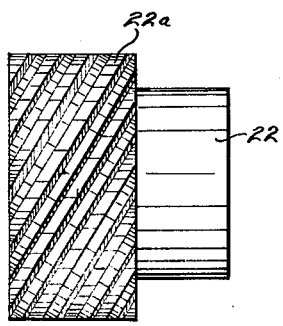
Fig. 3 is a pictorial representation of the peripheral helical spline on the inner element in the right half of Fig. 1.

Those familiar with this art will recognize that the present invention may be applied in many ways, but it has been chosen to illustrate the same as a drive differential for an automobile with Fig. 1 generally being a longitudinal section through the rear axle shafts having the automobile rear wheels respectively at their outer ends.

The conventional differential mechanism for an automobile has certain desirable and undesirable characteristics. It transmits equal torques to the road wheels, while allowing them to turn at different speeds, to permit driving around a corner. The speed of the ring gear will always be the average of the speeds of the two wheels. The big disadvantage shows up when one wheel has no traction. This may happen either on slippery surfaces or whenever a wheel lifts off the ground. This wheel then spins without transmitting any torque to the road. Since the differential always transmits equal torques to the rear wheels, absolutely no torque will be exerted by the other wheel, and the car will be unable to move. The connecting means of the present differential construction combines the advantages while eliminating the disadvantages of the conventional differential. It permits differential movement while turning around the corner and normally provides a locked, direct drive under normal conditions when both wheels are driven by the engine and are traveling at the same speed. This will not allow one wheel to spin without taking the other along also. When the car is driven around a corner, the inner wheel on the curve follows a shorter path and the outer wheel is turned faster by the road to unlock or unbind the driving connection so that a true differential action can take place with both wheels being driven.

Figure 2:
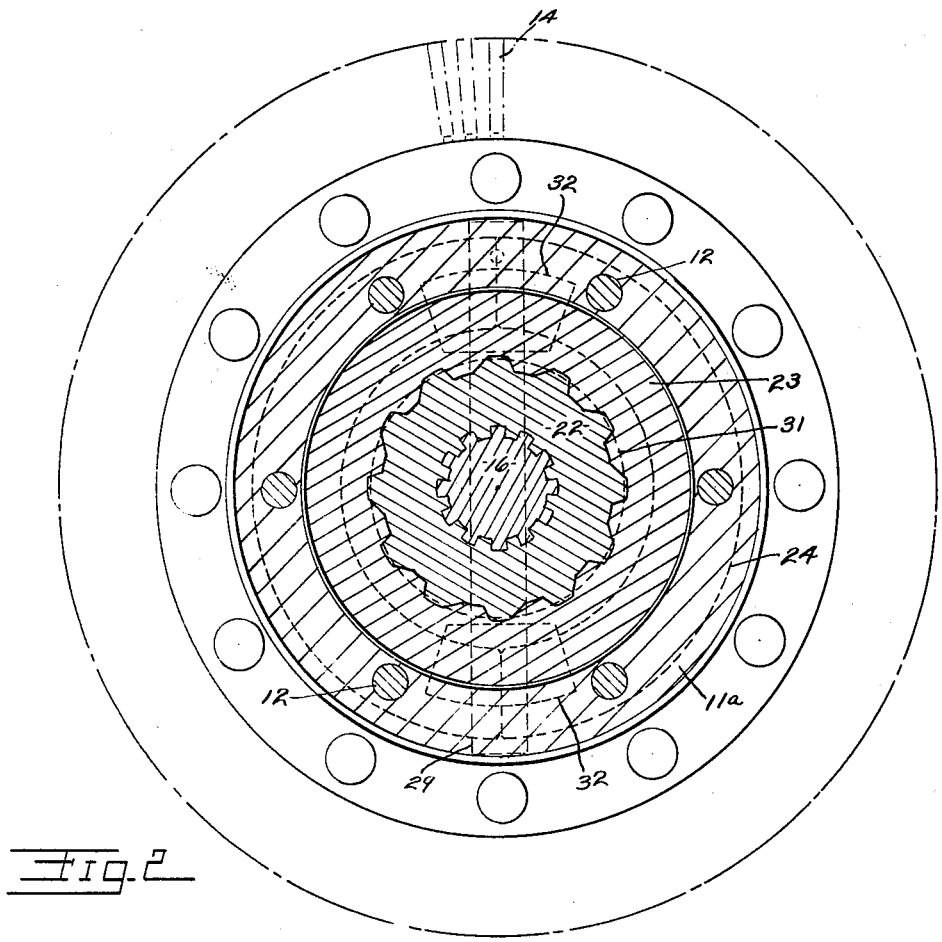
Fig. 2 is a transverse sectional view taken along the line 2—2 of Fig. 1 through the differential drive construction.

Here, a driving member 10 is rotatably driven by the drive shaft from the automobile motor. The driving member includes a cage 11 formed of opposite end sections 11a and 11b as well as a center section 11c connected together by through bolts 12 spaced about a circumference in the manner shown in Figs. 1 and 2. A ring gear 14 is secured to end section 11b in meshing relationship with a drive pinion on the drive shaft from the automobile engine so that rotation of the drive shaft will also rotate cage 11 about the horizontal axis in Fig. 1 and the central axis in Fig. 2.

Driven members or shafts 15 and 16 are coaxially mounted in the cage 11 and rotatable about this axis. The rear wheels of the automobile are mounted respectively on the outer ends of these shafts 15 and 16 while cage 11 surrounds the inner end of the shafts.

The present invention is primarily directed to the connecting means drivingly connecting the driving member 10 and the driven members 15 and 16.

Two pairs of elements 20, 21 and 22, 23, located within cage 11, are drivingly connected between the driving member 10 and driven members 15 and 16. Each pair includes coaxial inner element 20 or 22 and outer element 21 or 23 with the pairs carried respectively, one pair coaxially by each driven member 15 or 16. The outer and inner elements resemble nut and screw members since they have coacting helical splines 20a, 21a or 22a, 23a therebetween. However, the construction may use instead of splines any suitable coacting drive faces (such as angular serrations, wedges, or any other suitable construction providing a wedging action) inclined with respect to the rotational axis of the driven members 15 and 16 through which the drive between the elements is transmitted. Coacting portions of helical splines or other suitable drive faces are preferably arranged in arcuate contact around at least part of the circumference, and preferably around the entire circumference as shown, so that the load is distributed uniformly around the entire axis and maximum torque may be transmitted with the minimum size differential.

Two separate binding units are provided drivingly connected respectively, one between the driving member 10 and each of the driven members 15 or 16. Each binding unit is independently movable respectively between binding and unbinding positions upon relative rotation of its outer element 21 or 23 relative to its associated inner element 20 or 22. Each binding unit includes a plurality of coactable thrust or binding surfaces shown herein as peripheral grooves 21c and 23c in elements 21 and 23 and two inwardly directed thrust rings 24 and 25 secured to the cage 11 by the through bolts 12. The rings extend respectively one ring into each groove and are coactable, upon relative axial movement of elements 21 and 23 caused by rotation thereof, with one or the other of the opposite walls of the associated element grooves, depending upon the direction of axial movement thereof. In the unbinding position, a relative sliding movement may take place between the sides of the rings 24 and 25 and the side walls of the grooves 21c and 23c. Each binding unit is moved between its positions by relative rotation of its outer element 21 or 23 with respect to its inner element 20 or 22 since the inner elements are generally fixed against axial movement relative to cage 11. Inner elements 20 and 22 are respectively splined, keyed or formed integrally with driven shafts 15 and 16 respectively. A pair of annular bearing plates 27 and 28 are located between the elements and the cage end sections 11a and 11b; and a pin 29 extends transversely through the cage 11, is secured thereto by a pinned joint 30, and extends through a diametrical bore in flat and round disc 31 to provide thrust faces 31a and 31b for axially locating the respective elements 20 and 22 against endwise movement and for serving as a stop portion to backstop any of these elements.

Suitable balancing gear means is rotatably carried by the cage 11 for drivingly connecting the driven members 15 and 16 by a differential action when desired. This balancing gear means may be of any suitable form, such as a straight bevel gear found in a conventional differential, or a spiral bevel gear, or any suitable form of continuous "teeter bar," or single or multiple and overlapping spur gear type balancing gears, etc. Here, bevel gears 32 are shown of the standard bevel gear type. Two are shown but a fewer or greater number may be provided approximately equidistant apart around the circumference of the axis of the driven members depending on whether a lighter or heavier torque is to be transmitted. Bevel gears 32 are rotatably mounted on pin 29 to serve as equalizer gears between the driven members. Bevel gears 32 have their teeth meshing with gear teeth 21d and 23d formed along conical surfaces on outer elements 21 and 23 respectively.

Figure 4:
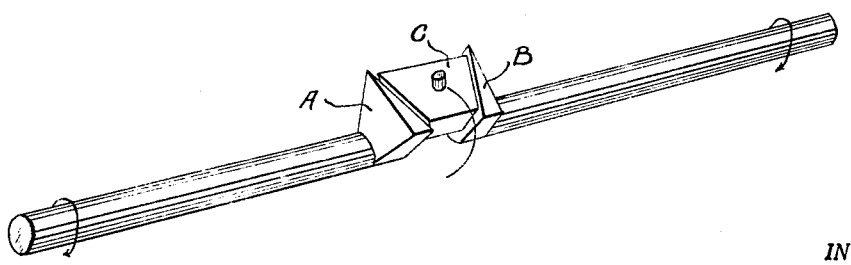

In operation, this differential automatically provides binding unit actuation of the desired type in response to the drive action. Both of the binding units are moved to the binding position in response to the driving action of the driving member 10 on both of the driven members 15 and 16 to lock all of the members together to rotate as a unit during normal driving in either the straight-ahead or reverse direction. Rotation of driving member 10 by the automobile motor will also rotate pin 29 and balance gears 32 about the axis of the driven shafts 15 and 16 since the frictional resistance and inertia of the wheels and their driven parts is substantially greater than that between the helical splines 20a, 21a and 22a, 23a. The balance gears 32 will rotate the outer elements 21 and 23 on the splines until one face of each of the grooves 21c and 23c binds tightly against its associated thrust rings 25 and 24 to lock the members together so they will rotate as a unit as the wedges of the helices force the thrust surfaces into tighter binding contact. Then, the wedge C, symbolically shown in Fig. 4 and carried by the driving member, will drive by wedging engagement the wedges A and B on the associated driven shafts. This provides a locked, direct drive when driven by the engine. This is also shown clearly in Fig. 5 wherein members 120, 121, 132, 123 and 122 are simplified versions of components 20, 21, 32, 23 and 22. As the driving member 10 or cage is rotated in a clockwise direction D1 looking in from the right toward the left in Fig. 5, end thrust forces T1, T2, T3, and T4 will be applied respectively to members 120, 121, 123, and 122 respectively by the thrust surfaces of washer 28, rings 25 and 24, and disc 31 to hold the helices in working engagement and the amount of thrust pressure on these thrust surfaces is directly proportional to the helix angle. As the cage rotates, it carries with it members 120 and 122. The driving force to these members is provided by the resultant friction between the thrust surfaces and by the helical splines.

If one wheel is jacked up off the ground or slips on ice or in mud, a conventional differential will permit this wheel to spin freely and no torque will be exerted by the other wheel so that the car will be unable to move. In contrast, the presently disclosed differential will not permit this wheel to spin, but instead will lock up the differential so that both wheels will turn and apply a driving torque to drive the automobile off the jack or through the slippery or muddy area. Even if the binding units are in their unbinding positions when one wheel of the car is susceptible to this free spinning action, the spinnable wheel will have sufficient inertia and frictional drag to cause the motor to wind up the differential to its locked or bound together position. Then, the automobile may easily be driven away. One wheel will not be allowed to spin without applying sufficient driving torque to the other wheel and taking it along too. Of course, the degree of wind-up or binding and the advantages obtained depend upon the helix angle of the splines 20a, 21a, 22a and 23a. Zero degrees, of course, would be a straight spline and would give no advantage over the conventional differential. As the helix angle is changed from one degree up to 63 degrees traction advantage increases. At approximately 63 degrees, one wheel can be jacked up off the terrain and the other wheel will drive the vehicle off the jack. Above 63 degrees very little improvement occurs. Either wheel will be positively driven when the members are locked together. It has been found that 55 degrees is the preferred angle. As the helix angle gets close to zero degrees not sufficient wedging action occurs, and hence not sufficient friction at the binding or thrust surfaces is obtained; when the angle gets close to 90 degrees, galling of the parts occurs by too much lock-up therebetween. A 0.005 inch clearance has been found suitable clearance between the rings 24, 25 and element grooves 21c, 23c to permit shifting to one face for forward drive to stop the differential action, shifting to the other face for rearward drive to stop the differential action, and movement to a central or unbinding position where no galling will occur.

As the automobile turns a corner or one wheel travels faster than the other over rough terrain, true differential action will take place. As one driven member, such as the outer wheel on the curve is overdriven or moves faster than the driving member 10, rotation of element 22 will move its binding unit toward the unbinding position to permit relative rotation of its wheel faster than either the other wheel or the differential cage 11. This is shown symbolically in Fig. 4 by having one wedge, such as A, rotate clockwise in the direction of its arrow ahead of wedge C which still drives wedge B at the same time due to the balancing gear 32 and power will follow wedge C as it advances. The other wheel or wedge A is turned faster by the road since it has a longer path to travel.

Figure 5:
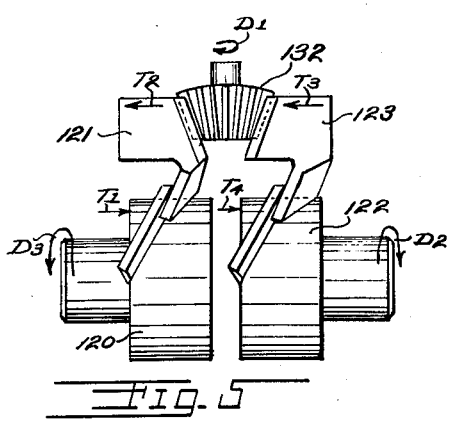
Fig. 5 is a pictorial representation of the component assembly parts in Fig. 1.

For example, assume that the outer wheel on the curve were on member 122 in Fig. 5 and it was rotating at 101 r.p.m. in the direction D2, the rotational axis of gear 132 is carried by the cage at 100 r.p.m. in the direction D1, and the inner wheel were on member 120 rotating in the direction D3 at 99 r.p.m. The wedge on member 122 moves ahead of the driving cage and the axis of gear 132 because of the difference between 101 and 100 r.p.m., while member 120 moves backward with respect to the driving cage and the axis of gear 132 because of the difference between 100 and 99 r.p.m. Since the torques between gear 132 and members 121 and 123 must be equal to perform driving, the differential action of gear 132 permits member 123 to move ahead with member 122 with respect to the driving cage while member 121 can move behind with member 120. Hence, the driven cage always simultaneously drives both wheels at the proper speed around a curve of any arcuate extent since the driving wedges between members 120, 121 and 122, 123 remain in driving contact. Sufficient slippage can take place at the thrust or binding surfaces to permit relative movement between the thrust surfaces. Hence, true differential action is retained when the wheels are following paths of different lengths, such as rounding a corner or on irregular terrain.

The hand or direction of advance of the helices in the different element pairs 20, 21 and 22, 23 may be of the same hand, both right-handed or both left-handed, or may each have a different hand, i.e., one right-handed and the other left-handed. If they are of the same hand, the advantage will be interchangeability of parts and the disadvantage will be the amount of end thrust loading on bearing plate 27 or 28, depending on the direction of vehicle drive. If they are of the opposite hand, the thrust load on any one of these bearing plates will be divided in half but interchangeability of parts will not be possible.

Various changes in details and arrangement of parts can be made by one skilled in the art without departing from either the spirit of this invention or the scope of the appended claims.

What I claim is:

1. In a differential drive construction, a rotatable driving member, a pair of rotatable driven members, connecting means drivingly connecting said driving and driven members, said connecting means including a pair of elements drivingly connected between at least two of said members and having coacting drive faces inclined with respect to the rotational axis through which the drive between said at least two members is transmitted, coacting portions of said faces being arranged at least part of the distance around the circumference of said axis, said driving member having a stop portion thereof located between said driver members and at one side of both said elements, connecting means for said members and elements responsive to the drive between said last two mentioned members for urging said stop portion and one of said elements into engagement so that said portion acts as a backstop for said last mentioned element and thrust load, pressure, galling and relative velocity for said last mentioned element is minimized.

2. In a differential drive construction, a rotatable driving member, a pair of rotatable driven members, connecting means drivingly connecting said driving and driven members, said connecting means including a pair of elements drivingly connected between at least two of said members and having coacting drive faces inclined with respect to the rotational axis through which the drive between said at least two members is transmitted, coacting portions of said faces being arranged at least part of the distance around the circumference of said axis, said driving member having a stop portion including a through pin extending diametrically through said driving member and located between said driven members and at one side of both said elements and supported at opposite ends in the remainder of said driving member, and said driving member including balance gear means rotatably carried by said pin about an axis extending transverse to the axis of said elements with said balance gear means coacting in driving connection with one of said elements, connecting means for said members and elements responsive to the drive between said last two mentioned members for urging said stop portion and one of said elements into engagement so that said portion acts as a backstop for said last mentioned element and thrust load, pressure, galling and relative velocity for said last mentioned element is minimized.

3. In a differential drive construction, a rotatable driving member, a pair of rotatable driven members, connecting means drivingly connecting said driving and driven members, said connecting means including a pair of elements drivingly connected between at least two of said members and having coacting drive faces inclined with respect to the rotational axis through which the drive between said at least two members is transmitted, coacting portions of said faces being arranged at least part of the distance around the circumference of said axis, said driving member including a housing with a plurality of axially arranged component parts forming a bore in assembled position housing said elements, said driving member having a stop portion thereof located between said driven members and extending transversely through said driving member and at one side of both said elements and supported at its outer ends in the remainder of said driving member, and said driving member including balance gear means rotatably carried by said portion and coacting in driving connection with one of said elements, connecting means for said members and elements responsive to the drive between said last two mentioned members for urging said stop portion and one of said elements into engagement so that said portion acts as a backstop for said last mentioned element and thrust load, pressure, galling and relative velocity for said last mentioned element is minimized.

4. In a differential drive construction, a rotatable driving member, a pair of rotatable driven members, and connecting means drivingly connecting said driving and driven members, said connecting means including a pair of elements drivingly connected between at least two of said members and having coacting drive faces inclined with respect to the rotational axis through which the drive between said at least two members is transmitted and with at least one of said elements movable between two axially spaced apart positions, coacting portions of said faces being arranged at least part of the distance around the circumference of said axis, said one element having an annular groove with approximately parallel opposite side walls providing respectively two surfaces intermediate the ends of said one element engageable alternately in said two positions with correspondingly shaped surfaces straddled by said groove and operatively connected against rotation relative to said driving member.

5. In a differential drive construction, a rotatable driving member, a pair of rotatable driven members, a first connecting means drivingly connecting said driving member to one of said driven members, and a second connecting means drivingly connecting said driving member to the other driven member, said second connecting means including binding means movable between binding and unbinding positions independently of operation of said first connecting means, including an actuating means for moving said binding means to one position in response to the driving action of said driving member on said one driven member to bind it to said driven member so as to rotate as a unit and for moving at least a portion of said binding means to the other position in response to overdriving one of said driven members faster than said driving member to permit relative rotation between at least said one driven member and said driving member, and including balancing gear means rotatably carried by said driving member drivingly connecting said driven members by a differential action in said other position, said binding means including one element non-rotatably carried by one of said driven members and including another element operatively connected to said driving member, said other element having gear means independent of said operative connection in gear meshing relationship with said balancing gear means.

6. A construction, as set forth in claim 4, with said driving member including a housing with a plurality of axially arranged component parts forming a bore in assembled position housing said elements; and including a split ring located in said annular groove, provided with said correspondingly shaped surfaces, and provided with a cylindrical surface coacting with cylindrical bore surface portions on at least one of said housing parts.

7. In a differential drive construction, a rotatable driving member, a pair of rotatable driven members, a first connecting means drivingly connecting said driving member to one of said driven members, and a second connecting means drivingly connecting said driving member to the other driven member, said second connecting means including binding means movable between binding and unbinding positions independetly of operation of said first connecting means, including an actuating means responsive to the driving action of said driving member on one of said driven members for moving said binding means to one position so that said driving member is bound to said driven member with a force approximately proportional to the torque transmitted between said driving member and one of said driven members to rotate as a unit, including an actuating means responsive to overdriving one of said driven members faster than said driving member for moving at least a portion of said binding means to the other position so that relative rotation is permitted between at least one driven member and said driving member, and including balancing gear means rotatably carried by said driving member drivingly connecting said driven members by a differential action in said other position.

8. A combination, as set forth in claim 7, with said second connecting means having means operatively connecting said elements, members and gear means so that said balance gear means drives at least one driven member through said binding means.

9. In a differential drive construction, a rotatable driving member, a pair of rotatable driven members, a first connecting means drivingly connecting said driving member to one of said driven members, and a second connecting means drivingly connecting said driving member to the other driven member, said second connecting means including binding means movable between binding and unbinding positions indepedently of operation of said first connecting means, including an actuating means responsive to the driving action of said driving member on one of said driven members for moving said binding means to one position so that said driving member is bound to said driven member to rotate as a unit, including an actuating means responsive to overdriving one of said driven members faster than said driving member for moving at least a portion of said binding means to the other position so that said binding means is in said unbinding position during said overdriving so as to permit relative rotation between at least one driven member and said driving member without substantial drag throughout the overdriving action, and including balancing gear means rotatably carried by said driving member drivingly connecting said driven members by a differential action in said other position.

10. In a differential drive construction, a rotatable driving member having a plurality of housing parts, a pair of rotatable driven members, and connecting means drivingly connecting said driving and driven members, said connecting means including a pair of elements drivingly connected between at least two of said members and having coacting drive faces inclined with respect to the rotational axis through which the drive between said at least two members is transmitted, coacting portions of said faces being arranged at least part of the distance around the circumference of said axis, said elements being coaxially and telescopically arranged inner and outer elements, said connecting means including means operatively connecting said elements and said housing parts so that both said elements are movable between axially spaced apart positions with each of said elements engaging against different housing parts and with both elements engaging against housing parts in both positions.

11. A combination, as set forth in claim 9, with said second connecting means having means operatively connecting said elements, members and gear means so that the motion of said overdriven member is transmitted between said overdriven member and balancing gear means through the binding means to move the binding means toward the other position.

12. In a differential drive construction, a rotatable driving member, a pair of coaxial rotatable driven members, and connecting means drivingly connecting said driving and driven members, said connecting means including two pairs of elements drivingly connected between said members and carried respectively one pair by each driven member, said elements having coacting drive faces inclined with respect to the axis of said driven members through which the drive between said members is transmitted, said connecting means including means operatively connecting said elements and members so that the relative roational contacting movement between any two elements is never substantially greater than the relative rotational movement between said driven members, said last mentioned means located between said pairs and spacing elements of one pair out of contact with elements of the other pair.

References Cited in the file of this patent

UNITED STATES PATENTS

| 906,017 | Hedgeland | Dec. 8, 1908 |
|---|---|---|
| 1,361,895 | Nogrady | Dec. 14, 1920 |
| 1,566,101 | Goodhart | Oct. 6, 1925 |
| 2,234,591 | Fitzner | Mar. 11, 1941 |
| 2,397,374 | Schlicksupp | Mar. 26, 1946 |

FOREIGN PATENTS

| 262,489 | Switzerland | Oct. 17, 1949 |
|---|---|---|
| 854,155 | Germany | Oct. 30, 1952 |